United States Patent
Durkee

(10) Patent No.: US 9,753,210 B2
(45) Date of Patent: Sep. 5, 2017

(54) OPTICAL WAVEGUIDE BODY

(71) Applicant: CREE, INC., Durham, NC (US)

(72) Inventor: John W. Durkee, Raleigh, NC (US)

(73) Assignee: Cree, Inc., Durham, NC (US)

(*) Notice: Subject to any disclaimer, the term of this patent is extended or adjusted under 35 U.S.C. 154(b) by 0 days.

(21) Appl. No.: 15/453,297

(22) Filed: Mar. 8, 2017

(65) Prior Publication Data

US 2017/0176666 A1 Jun. 22, 2017

Related U.S. Application Data

(62) Division of application No. 13/841,074, filed on Mar. 15, 2013, now Pat. No. 9,625,638.

(51) Int. Cl.
*G02B 6/10* (2006.01)
*F21V 8/00* (2006.01)

(52) U.S. Cl.
CPC ......... *G02B 6/0046* (2013.01); *G02B 6/0028* (2013.01); *G02B 6/0038* (2013.01); *G02B 6/0055* (2013.01)

(58) Field of Classification Search
CPC .. G02B 6/0028; G02B 6/0046; G02B 6/1228; G02B 2006/12195
See application file for complete search history.

(56) References Cited

U.S. PATENT DOCUMENTS

| | | | | |
|---|---|---|---|---|
| 5,528,720 A * | 6/1996 | Winston | ..... | F21V 5/02 385/129 |
| 6,002,829 A * | 12/1999 | Winston | ..... | F21V 5/02 385/129 |
| 7,046,905 B1 * | 5/2006 | Gardiner | ..... | G02B 6/0036 385/146 |
| 9,625,638 B2 * | 4/2017 | Durkee | ..... | G02B 6/0038 |
| 2007/0274654 A1 * | 11/2007 | Choudhury | ..... | G02B 6/1228 385/131 |
| 2010/0247047 A1 * | 9/2010 | Filippov | ..... | C03B 37/02763 385/127 |

* cited by examiner

*Primary Examiner* — Daniel Petkovsek
(74) *Attorney, Agent, or Firm* — McCracken & Gillen LLC

(57) ABSTRACT

An optical waveguide body includes a first layer of optically transmissive material and a second layer of optically transmissive material in contact with the first layer. At least one of the first and second layers is tapered and the first layer has a first index of refraction and the second layer has a second index of refraction less than the first index of refraction and the first and second indices of refraction are both greater than about 1.0.

20 Claims, 3 Drawing Sheets

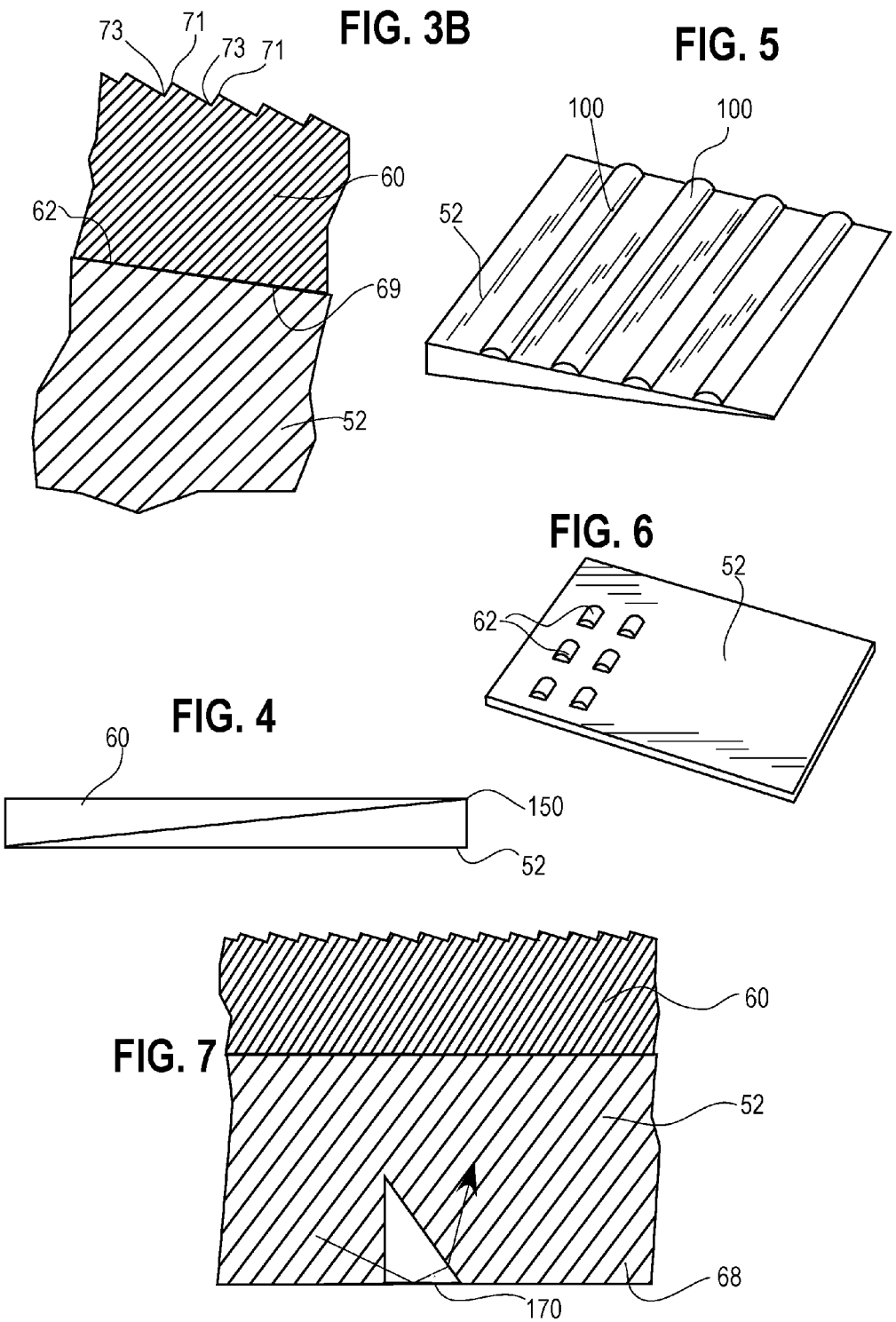

OPTICAL WAVEGUIDE BODY

CROSS REFERENCE TO RELATED APPLICATIONS

This application is a divisional of the U.S. patent application Ser. No. 13/841,074 filed on Mar. 15, 2013, entitled "Optical Waveguide Body" owned by the assignee of the present application and the disclosure of which is incorporated by reference herein.

REFERENCE REGARDING FEDERALLY SPONSORED RESEARCH OR DEVELOPMENT

Not applicable

SEQUENTIAL LISTING

Not applicable

BACKGROUND OF THE INVENTION

1. Field of the Invention

The present inventive subject matter relates to optical waveguides, and more particularly to optical waveguides for general lighting.

2. Background of the Invention

An optical waveguide mixes and directs light emitted by one or more light sources, such as one or more light emitting diodes (LEDs). A typical optical waveguide includes three main components: one or more coupling elements, one or more distribution elements, and one or more extraction elements. The coupling component(s) direct light into the distribution element(s), and condition the light to interact with the subsequent components. The one or more distribution elements control how light flows through the waveguide and is dependent on the waveguide geometry and material. The extraction element(s) determine how light is removed by controlling where and in what direction the light exits the waveguide.

When designing a coupling optic, the primary considerations are: maximizing the efficiency of light transfer from the source into the waveguide; controlling the location of light injected into the waveguide; and controlling the angular distribution of the light in the coupling optic. One way of controlling the spatial and angular spread of injected light is by fitting each source with a dedicated lens. These lenses can be disposed with an air gap between the lens and the coupling optic, or may be manufactured from the same piece of material that defines the waveguide's distribution element(s). Discrete coupling optics allow numerous advantages such as higher efficiency coupling, controlled overlap of light flux from the sources, and angular control of how the injected light interacts with the remaining elements of the waveguide. Discrete coupling optics use refraction, total internal reflection, and surface or volume scattering to control the distribution of light injected into the waveguide.

After light has been coupled into the waveguide, it must be guided and conditioned to the locations of extraction. The simplest example is a fiber-optic cable, which is designed to transport light from one end of the cable to another with minimal loss in between. To achieve this, fiber optic cables are only gradually curved and sharp bends in the waveguide are avoided. In accordance with well-known principles of total internal reflectance light traveling through a waveguide is reflected back into the waveguide from an outer surface thereof, provided that the incident light does not exceed a critical angle with respect to the surface.

In order for an extraction element to remove light from the waveguide, the light must first contact the feature comprising the element. By appropriately shaping the waveguide surfaces, one can control the flow of light across the extraction feature(s). Specifically, selecting the spacing, shape, and other characteristic(s) of the extraction features affects the appearance of the waveguide, its resulting distribution, and efficiency.

Hulse U.S. Pat. No. 5,812,714 discloses a waveguide bend element configured to change a direction of travel of light from a first direction to a second direction. The waveguide bend element includes a collector element that collects light emitted from a light source and directs the light into an input face of the waveguide bend element. Light entering the bend element is reflected internally along an outer surface and exits the element at an output face. The outer surface comprises beveled angular surfaces or a curved surface oriented such that most of the light entering the bend element is internally reflected until the light reaches the output face Parker et al. U.S. Pat. No. 5,613,751 discloses a light emitting panel assembly that comprises a transparent light emitting panel having a light input surface, a light transition area, and one or more light sources. Light sources are preferably embedded or bonded in the light transition area to eliminate any air gaps, thus reducing light loss and maximizing the emitted light. The light transition area may include reflective and/or refractive surfaces around and behind each light source to reflect and/or refract and focus the light more efficiently through the light transition area into the light input surface of the light emitting panel. A pattern of light extracting deformities, or any change in the shape or geometry of the panel surface, and/or a coating that causes a portion of the light to be emitted, may be provided on one or both sides of the panel members. A variable pattern of deformities may break up the light rays such that the internal angle of reflection of a portion of the light rays will be great enough to cause the light rays either to be emitted out of the panel or reflected back through the panel and emitted out of the other side.

A.L.P. Lighting Components, Inc. of Niles, Ill., manufactures a waveguide having a wedge shape with a thick end, a narrow end, and two main faces therebetween. Pyramid-shaped extraction features are formed on both main faces. The wedge waveguide is used as an exit sign such that the thick end of the sign is positioned adjacent a ceiling and the narrow end extends downwardly. Light enters the waveguide at the thick end and is directed down and away from the waveguide by the pyramid-shaped extraction features.

SUMMARY OF THE INVENTION

According to one aspect of the present invention, an optical waveguide body includes a first layer of optically transmissive material and a second layer of optically transmissive material in contact with the first layer. At least one of the first and second layers is tapered and the first layer has a first index of refraction and the second layer has a second index of refraction less than the first index of refraction and the first and second indices of refraction are both greater than about 1.0.

In accordance with another aspect of the present invention, an optical waveguide body includes first and second layers of first and second optically transmissive materials, respectively, wherein the first layer is tapered from an input surface to an end surface. The first and second materials have first and second different indices of refraction, respectively, and both of the first and second indices of refraction are greater than about 1.0. Further, the second layer has a textured outer surface.

In accordance with yet another aspect of the present invention, an optical waveguide body includes first and second layers of first and second optically transmissive materials, respectively, wherein the first layer is tapered from an input surface to an end surface. The first and second materials have first and second different indices of refraction, respectively, wherein the first index of refraction is greater than the second index of refraction, and both of the first and second indices of refraction are greater than about 1.0. Further, the second layer has a textured outer surface.

Other aspects and advantages of the present invention will become apparent upon consideration of the following detailed description and the attached drawings.

BRIEF DESCRIPTION OF THE DRAWINGS

FIG. 3B is another enlarged fragmentary view of the portion of the first and second layers of FIG. 2;

FIG. 4 is a side elevational view of a further embodiment of a waveguide body;

FIG. 5 is an isometric view of yet another embodiment of a waveguide body;

FIG. 6 is an isometric view of a still further embodiment of a waveguide body;

FIG. 7 is a sectional view similar to FIG. 3 of another embodiment of a waveguide body.

DETAILED DESCRIPTION OF THE PREFERRED EMBODIMENTS

Figure 1:
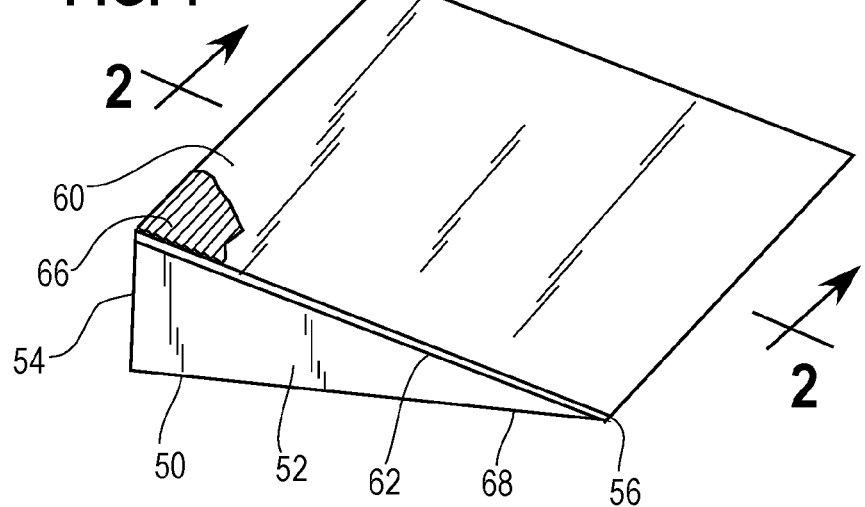
FIG. 1 is an isometric view of a first embodiment of a waveguide body.

An optical waveguide includes a waveguide body that mixes and directs light out one or more surfaces. A typical waveguide body requires multiple layers of optical materials to control and extract light from the waveguide body. While each additional layer affords increased optical control, such a design can be expensive owing to the number of layers that are used and optical losses are typically encountered at each interface between layers.

In accordance with one aspect, the present invention is directed to the distribution and extraction of light from an optical waveguide with a high degree of control and a minimal number of layers. In a particular embodiment, a waveguide body achieves a high degree of optical control, optical efficiency, and aesthetic appearance with only two layers. The first layer is a block or other shaped body of optically transmissive material. The first layer may be tapered in that the layer has opposed major surfaces, a relatively thick input surface disposed at first ends of the major surfaces and into which light developed by a light source is coupled and further having a relatively thin end surface disposed at second ends of the major surfaces. The second layer is also an optically transmissive material, and is bonded to one of the major surfaces of the first layer. The outside surface of the second layer may be formed with an array of surface features. The second layer has an index of refraction lower than the first layer and higher than the surrounding environment. Thus, for example, if the first layer has an index of refraction of 1.5 and the surrounding environment is air having an index of refraction of 1.0, the second layer has an index of refraction between 1.5 and 1.0.

In this particular embodiment, because the first layer is tapered, the light inside bounces at increasingly steep angles against its surfaces through total internal reflection (TIR) and eventually escapes the first layer. This extraction occurs when the light reaches the layer's critical angle, which is defined by the difference in refractive index between the material of the first layer and its surrounding environment. Because the difference in refractive indices between the first layer and the second layer is less than the difference in refractive indices between the first layer and air, the critical angle at the bonded interface is reduced. As a result, light escapes through the bonded interface before light can escape through any of the non-bonded surfaces. In addition, in a particular embodiment, the surface texture of the second layer is selected to control the angular distribution of the extracted light. In this way, both the spatial location of extraction and angular direction of extraction are controlled.

It has been found that by selecting the degree of taper of the first layer and the index of refraction of the second layer, light can be extracted solely through the bonded interface, with negligible light escaping from other surfaces. This may eliminate or at least reduce the need for a reflector behind the waveguide body to collect any stray light. Inasmuch as the second layer serves the purposes of both extraction and distribution control, such element eliminates the need for a still further layer that controls light after extraction.

The interface between the first layer and the second layer, particularly, the surface finish of the interface and the method of bonding, are important considerations. The second layer could be created by one of many methods: a solid layer of controlled index material deposited on the first layer, a thin film micropatterned on the exterior surface of the first layer, a curable coating applied to the surface of the first layer, etc. are all possible. The two-layer construction could even be created by bonding two similar layers together and then subsequently changing the index of refraction of one or both of the layers.

In the example described above, the second layer may cover an entire surface of the first layer and only extracts light from a single side. However, it should be evident that the present invention applies to a wide range of waveguide geometries where extraction must be controlled with as few layers as possible. Additionally, raising the refractive index of the second layer above the index of refraction of the surrounding environment can serve a similar purpose as lowering the index of the extraction layer. Such an arrangement may even afford additional control, as the critical angle between the waveguide body and surrounding environment (such as air) becomes harder to break. The relative refractive index values between the adjacent layers is an important consideration.

The present invention controls stray light, provides high efficiency extraction and highly uniform extraction, and can be used to create a fully luminous output. The present invention can be used in any type of lamp or luminaire, such as a troffer.

Still further, the materials used herein may include an acrylic material, a silicone, a polycarbonate, or other suitable material(s) to achieve a desired effect and/or appearance.

Figure 2:
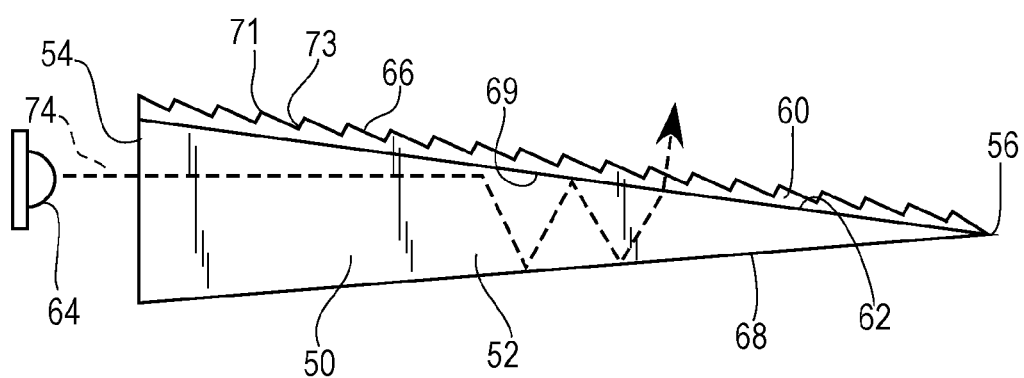
FIG. 2 is a sectional view of the waveguide body taken along the lines 2-2 of FIG. 1 in conjunction with a light source.

Referring to FIGS. 1 and 2, a waveguide body 50 includes a first portion or layer 52 having an input surface 54 and an end surface 56 opposite the input surface 54. A second layer 60 is bonded or otherwise secured to a first major surface 62 of the first layer. 52. The layers 52, 60 are optically transmissive. Light developed by one or more light sources, such as an LED 64 (FIG. 2), is directed into the input surface 54 and may be emitted out an outer surface 66 of the second layer 60.

Preferably, the first major surface 62 and an opposite major surface 68 of the first layer 52 are both planar. It should be noted, however, that either or both of these surfaces 62, 68 may be curved, if desired. Further, in the preferred embodiment, the surfaces 62 and 68 are disposed at an angle relative to one another so that the first layer 52 is tapered in overall shape. Still further in the preferred embodiment, the outer surface 66 of the second layer 60 is textured. Preferably, the textured surface 66 is stepped, so that light exiting the first layer 52 strikes the surface 66 in perpendicular fashion. This minimizes the amount of light reflected back into the body. If desired, an inner surface 69 of the second layer 60 and/or the surface 62 of the first layer may be smooth or textured. Also in the illustrated embodiment, the layer 52 is fabricated of an acrylic or other suitable optical material and has a first index of refraction. The second layer 60 is made of a different material than the first layer 52, such as silicone or a doped acrylic material, and has a second index of refraction. In the embodiment of FIGS. 1 and 2, the first index of refraction is preferably greater than the second index of refraction. Still further, in accordance with the illustrated embodiment when used in air having an index of refraction of about 1.0, the first index of refraction is about equal to 1.5 and the second index of refraction is between about 1.0 and about 1.5, and is preferably about 1.3. If desired, the waveguide body 50 may be used in a different environment having a different index of refraction less than the index of refraction of the second layer 60.

Still further in accordance with the illustrated embodiment, the textured surface 66 comprises alternating ridges and troughs 71, 73 and/or any other structures. The textured surface 66 may be formed by any suitable forming process, such as injection molding, embossing, stamping, milling, calendering, laser etching, or the like.

The light source 64 may develop light that is directly coupled into the waveguide body 50 via an air gap 74 and/or a coupling optic (not shown). The light source 64 may be a white LED or may comprise multiple LEDs including a phosphor-coated LED either alone or in combination with a color LED, such as a green LED, etc. In those cases where a soft white illumination is to be produced, the light source 64 typically includes a blue shifted yellow LED and a red LED. Different color temperatures and appearances could be produced using other LED combinations, as is known in the art. In one embodiment, the light source 64 comprises any LED, for example, an MT-G LED incorporating True-White® LED technology as developed and manufactured by Cree, Inc., the assignee of the present application.

Figure 3A:
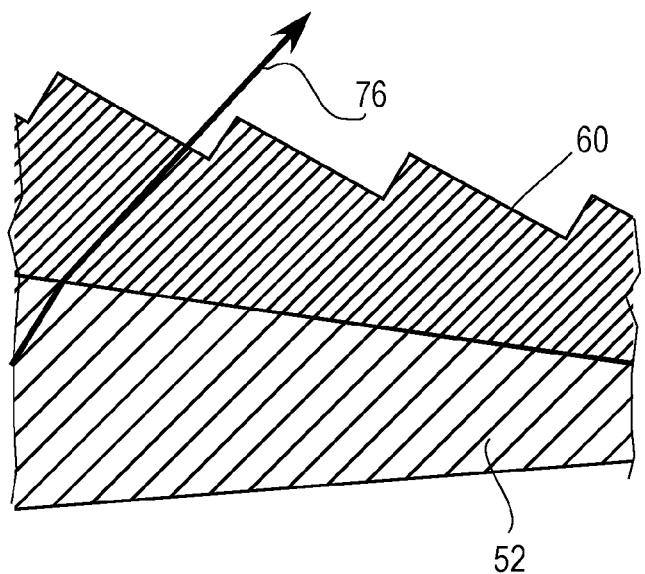
FIG. 3A is an enlarged fragmentary view of a portion of the first and second layers of FIG. 2

Light emitted from the light source 64 enters the waveguide body 50 through the input surface 54. The light is reflected by total internal reflection within the first layer 52 until an incident angle of the light falls below a critical angle, whereupon the light passes through the second layer 60 and exits the outer surface 66, shown by the light ray 76. The waveguide body 50 is designed to emit all or substantially all of the light from the outer surface 66 as the light travels through the waveguide body 50. The light is directed outwardly in a controlled manner by the textured surface, for example, as seen by the light ray 76 of FIG. 3A.

Any remaining light that does not exit the outer surface 66 may exit the waveguide 54 at the end surface 56. Alternatively, the end surface 56 may be coated with a reflective material, such as a white or silvered material to reflect any remaining light back into the waveguide body 50, if desired.

As shown in FIGS. 1 and 2 and as described above, the taper of the waveguide body 50 is linear between the input surface 54 and the end surface 56. According to one embodiment, a first thickness at the input surface 54 is about 2 mm to about 10 or more mm, and more preferably is between about 4 mm and about 8 mm, and most preferably is equal to about 6 mm. Further, a second thickness of the end surface is 1 mm or less.

If desired, the first and/or second layers may be of other shape(s). For example, FIG. 4 illustrates an embodiment where the first layer 52 and the second layer 60 are both tapered in opposite directions and are secured together in overlapping relationship to form a waveguide body 150 that is of substantially constant thickness throughout. Preferably, the body has a thickness of about 2 mm to about 10 or more mm, and more preferably is between about 4 mm and about 8 mm, and most preferably is equal to about 6 mm.

Further, one or more discontinuous features may be used in place of or alternatively to the continuous second layer 60. FIG. 5 illustrates an embodiment wherein a discontinuous layer comprising equally spaced linear facets 100 are secured or formed atop the first layer 52. FIG. 6 shows an embodiment in which a discontinuous layer comprising discrete facets 102 are secured or formed in a regular array atop the first layer 52. If desired, the facets 100 may be unequally spaced or the discrete facets 102 may be disposed irregularly across the layer 52. In both FIGS. 5 and 6 the index of refraction of the first layer 52 is greater than the index of refraction of the facets 100 or 102 and the index of refraction of the surroundings is less than the index of refraction of the facets 100 or 102. Preferably, the facets 100, 102 are smooth. In general, the number, geometry, and spatial array of such features across the first layer 52 affects the uniformity and distribution of emitted light.

FIG. 7 illustrates an embodiment in which a body of material 170 is disposed in the first layer 52. The body of material may be bonded to the layer 52. Contrary to the previous embodiments, the first layer 52 has an index of refraction less than an index of refraction of the body of material 170. The body of material 170 may, for example, be a polycarbonate plastic material having an index of refraction of about 1.6. The body of material 170 is shown as being v-shaped, although other shapes could alternatively be used. Other similar or identical bodies of material could be disposed at spaced locations in the layer 52. The layer 52 with the bodies of material 170 therein, and, optionally, the layer 60, direct light away from the surface 68 so that substantially all light is directed out the surface 66.

Figure 8:
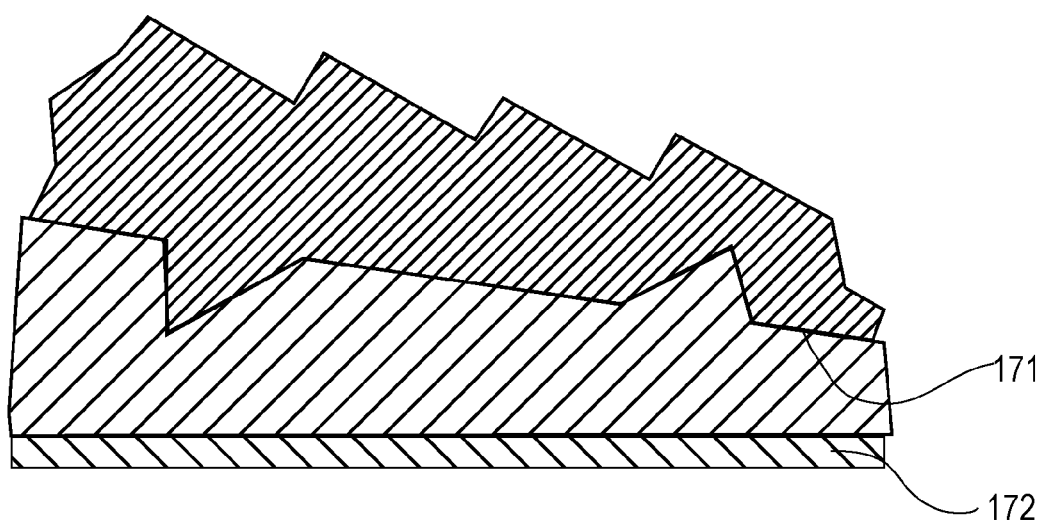
FIG. 8 is an enlarged, fragmentary, cross sectional view of an alternative embodiment of a waveguide body according to the present invention.

Other embodiments of the disclosure including all of the possible different and various combinations of the individual features of each of the foregoing embodiments and examples are specifically included herein. For example, the material used as the second layer 60 may have a varying index of refraction over the extent thereof. The waveguide and the components thereof may have different shapes. In addition, the various layers need not be of the shapes described, and one layer could extend into or away from the adjacent layer, if desired. Such an embodiment is shown in FIG. 8, in which the layers have a non-planar interface 171. Also as seen in FIG. 8, a reflective layer or coating may be disposed on a bottom surface of the first layer 52. The reflective layer 172 may be a specular material, a white diffuse material, or the like.

INDUSTRIAL APPLICABILITY

The waveguide layers and other components described herein may be used singly or in combination. In any case, one may obtain a desired light output distribution using a minimum number of optical layers.

Numerous modifications to the present disclosure will be apparent to those skilled in the art in view of the foregoing description. Accordingly, this description is to be construed as illustrative only and is presented for the purposes of enabling those skilled in the art to make and use the present disclosure and to teach the best mode of carrying out the same.

I claim:

1. An optical waveguide body, comprising:
   a first layer of optically transmissive material comprising a thickness defined by a first side and second side;
   a second layer of optically transmissive material defined by a third side and a fourth side opposite the third side, wherein a first ridge of the second side extends into the second layer and a second ridge of the third side extends into the first layer;
   wherein the second layer comprises a plurality of further ridges and grooves disposed on the fourth side thereof;
   wherein the first side and fourth side are tapered toward one another;
   wherein the first layer has a first index of refraction and the second layer has a second index of refraction less than the first index of refraction and wherein the first and second indices of refraction are both greater than about 1.0.

2. The optical waveguide body of claim 1, wherein the second layer is discontinuous.

3. The optical waveguide of claim 2, wherein the second layer comprises linear facets.

4. The optical waveguide of claim 2, wherein the second layer comprises discrete facets.

5. The optical waveguide body of claim 1, wherein the second layer is continuous and extends fully over the first layer.

6. The optical waveguide body of claim 1, in combination with a light emitting diode (LED) that develops light which is transmitted into the waveguide body.

7. The optical waveguide body of claim 1, further including a reflective layer disposed on a surface of the first layer opposite the second layer.

8. The optical waveguide body of claim 1, wherein an interface between the first and second layers is non-planar.

9. The optical waveguide body of claim 1, wherein the first layer has an index of refraction that varies over the extent thereof.

10. The optical waveguide body of claim 1, wherein the first and second indices of refraction are greater than about 1.0 to about 1.5.

11. An optical waveguide body, comprising:
    a first layer of optically transmissive material comprising a thickness defined by a first side and second side;
    a second layer of optically transmissive material defined by a third side and a fourth side opposite the third side, wherein a first ridge of the second side extends into the second layer and a second ridge of the third side extends into the first layer, wherein the second ridge is different in shape from the first ridge;
    wherein the second layer comprises a plurality of further ridges and grooves disposed on the fourth side thereof;
    wherein the first side and fourth side are tapered toward one another;
    wherein the first layer has a first index of refraction and the second layer has a second index of refraction less than the first index of refraction and wherein the first and second indices of refraction are both greater than about 1.0.

12. The optical waveguide body of claim 11, wherein the second layer is discontinuous.

13. The optical waveguide body of claim 12, wherein the second layer comprises linear facets.

14. The optical waveguide body of claim 12, wherein the second layer comprises discrete facets.

15. The optical waveguide body of claim 11, wherein the second layer is continuous and extends fully over the first layer.

16. The optical waveguide body of claim 11, in combination with a light emitting diode (LED) that develops light which is transmitted into the waveguide body.

17. The optical waveguide body of claim 11, wherein the fourth side comprises a plurality of ridges and grooves.

18. The optical waveguide body of claim 11, further comprising a reflective layer disposed on the first side of the first layer opposite the second layer.

19. The optical waveguide body of claim 11, wherein an interface between the first and second layers is non-planar.

20. The optical waveguide body of claim 11, wherein the first layer has an index of refraction that varies over the extent thereof.

* * * * *